(12) United States Patent
Prasad et al.

(10) Patent No.: US 8,724,573 B2
(45) Date of Patent: May 13, 2014

(54) RESOURCE ALLOCATION IN 4G MIMO CELLULAR UPLINKS

(75) Inventors: Narayan Prasad, Wyncote, PA (US);
Honghai Zhang, Ewing, NJ (US);
Meilong Jiang, Plainsboro, NJ (US);
Guosen Yue, Plainsboro, NJ (US);
Sampath Rangarajan, Bridgewater, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 277 days.

(21) Appl. No.: 13/343,398

(22) Filed: Jan. 4, 2012

(65) Prior Publication Data
US 2012/0170531 A1    Jul. 5, 2012

Related U.S. Application Data

(60) Provisional application No. 61/429,582, filed on Jan. 4, 2011.

(51) Int. Cl.
*H04W 72/04*    (2009.01)
*H04W 72/06*    (2009.01)

(52) U.S. Cl.
CPC ............ *H04W 72/04* (2013.01); *H04W 72/042* (2013.01); *H04W 72/06* (2013.01)
USPC ......... 370/329; 370/252; 455/450; 455/452.2

(58) Field of Classification Search
CPC ..... H04W 72/04; H04W 88/08; H04W 76/00; H04W 72/0446; H04W 72/0453; H04W 84/08; H04W 76/02; H04W 72/06; H04W 72/08; H04W 72/082; H04W 72/12; H04W 72/121; H04W 72/042

USPC ......... 370/252, 328, 329–330, 338, 342–344, 370/468; 455/450, 451.1, 452.1, 452.2, 509

See application file for complete search history.

(56) References Cited

U.S. PATENT DOCUMENTS 8,072,899 B2 * 12/2011 Pan et al. ................. 370/252
8,437,788 B2 *  5/2013 Li et al. .................... 455/509
8,483,737 B2 *  7/2013 Englund et al. ........... 455/509

(Continued)

OTHER PUBLICATIONS

Abrardo et al., "Message passing resource allocation for the uplink of multicarrier systems," Proceedings of IEEE International Conference on Communications (ICC) Jun. 2009. (6 pages).

(Continued)

*Primary Examiner* — Candal Elpenord
(74) *Attorney, Agent, or Firm* — Joseph Kolodka; Akitaka Kimura

(57) ABSTRACT

A method of uplink resource allocation is disclosed. The method includes computing a set of utilities for each of a finite set of transmission modes with a processor across a plurality of user devices, each having multiple transmit antennas, and iteratively allocating uplink resource blocks (RBs) and transmission modes to the plurality of user devices until all users have been allocated or no allocation is found, by selecting a mode that has a highest incremental utility sum for each user across one or more RBs, determining which user has the highest incremental utility sum, allocating the mode and RBs associated with the highest incremental utility sum to the user, and removing the allocated user from consideration. Other apparatuses, systems, and methods also are disclosed.

7 Claims, 4 Drawing Sheets

(56) References Cited

U.S. PATENT DOCUMENTS

| | | | |
|---|---|---|---|
| 8,489,105 B2 * | 7/2013 | Choi | 455/452.1 |
| 8,559,458 B2 * | 10/2013 | Maas et al. | 370/468 |
| 8,570,959 B2 * | 10/2013 | Ishii | 370/329 |
| 8,588,084 B2 * | 11/2013 | Tirkkonen et al. | 370/252 |
| 2008/0045272 A1 * | 2/2008 | Wang et al. | 455/561 |
| 2008/0304448 A1 * | 12/2008 | Hosein | 370/329 |
| 2010/0091727 A1 * | 4/2010 | Ishii | 370/329 |

OTHER PUBLICATIONS

Andrews et al., "Multiserver scheduling with contiguity constraints," Proceedings of IEEE Infocom, Apr. 2009, pp. 1278-1286.

Yang et al., "A message passing approach distributed resource allocation in uplink DFT-spread-OFDMA systems," IEEE Transactions on Communications, vol. 59, No. 4, Apr. 2011, pp. 1099-1113.

* cited by examiner

RESOURCE ALLOCATION IN 4G MIMO CELLULAR UPLINKS

RELATED APPLICATION INFORMATION

This application claims priority to provisional application Ser. No. 61/429,582, filed on Jan. 4, 2011, incorporated herein by reference.

BACKGROUND

1. Technical Field

The present invention relates to wireless communication systems and, in particular, to resource allocation for 4G MIMO uplinks.

2. Description of the Related Art

Orthogonal frequency-division multiple-access (OFDMA) has been selected as the air-interface for 4G wireless networks operating over wideband multi-path fading channels. Classical OFDMA involves assigning non-overlapping subcarriers among different users. Consequently, resource allocation for the OFDMA networks has been the subject of intense research in recent years, with the most of the focus being on the downlink. In addition, most of the resource allocation problems hitherto considered have been formulated as continuous optimization problems. These problems are in general non-linear and non-convex. The IEEE 802.16m standard has selected OFDMA as its uplink air-interface and also allows multi-antenna transmission and reception in the uplink. However, resource allocation algorithms for the 802.16m OFDMA uplink have to be re-designed in order to account for finite constellations, codebook based precoding by multi-antenna users, and an equal power constraint that is enforced on all scheduled users.

The $3^{rd}$ Generation Partnership Project long-term evolution Advanced (LTE-A) standard, meanwhile, has chosen discrete Fourier transform (DFT) spread OFDMA (DFT-S-OFDMA) as its uplink air-interface. DFT-S-OFDMA is a modified form of OFDMA wherein each user spreads its (coded) modulated information symbols using a DFT matrix and the spread symbols are mapped to its allocated subcarriers. The main advantage of the spreading operation is that, with a contiguous mapping, the spreading operation can result in a considerably lower peak-to-average-power ratio (PAPR) compared to classical OFDMA. In LTE-A systems the strict contiguity restriction of LTE systems is relaxed and each user can be allocated up-to two mutually non-contiguous frequency chunks (FCs), where each FC is a set of contiguous subcarriers. In addition, unlike LTE, the LTE-A uplink allows for multi-antenna transmission and reception. Resource allocation for the DFT-S-OFDMA uplink has been relatively much less studied. The LTE uplink scheduling problem itself is known to be NP-hard. Previous attempts have used a constant-factor approximation algorithm and a message passing based algorithm. However, neither of these algorithms is applicable to the LTE-A uplink.

SUMMARY

A method of uplink resource allocation is shown that includes iteratively allocating uplink resource blocks (RBs) to a plurality of user devices, each having multiple transmit antennas, until each user device has two mutually non-contiguous chunks allocated, where each said chunk is a set of contiguous RBs. Iterative allocation is achieved by determining an allocation for each user device that has an maximal incremental utility according to an approximation that has a worst-case guarantee; and assigning the determined allocations to the users for use in uplink transmissions.

A method of uplink resource allocation is shown that includes iteratively allocating uplink resource blocks (RBs) to a plurality of user devices, each having multiple transmit antennas, until each user device has two mutually non-contiguous chunks allocated, where each said chunk is a set of contiguous RBs, or until an iteration occurs with no allocations. Iterative allocation is achieved by determining a user for each RB that has a maximal incremental utility according to an approximation that has a worst-case guarantee; and assigning the determined allocations to the users for use in uplink transmissions.

A method of uplink resource allocation is shown that includes computing a set of utilities for each of a finite set of transmission modes with a processor across a plurality of user devices, each having multiple transmit antennas; and iteratively allocating uplink resource blocks (RBs) and transmission modes to the plurality of user devices until all users have been allocated or no allocation is found. Iterative allocation is achieved by selecting a mode that has a highest incremental utility sum for each user across one or more RBs; determining which user has the highest incremental utility sum; allocating the mode and RBs associated with the highest incremental utility sum to the user; and removing the allocated user from consideration.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
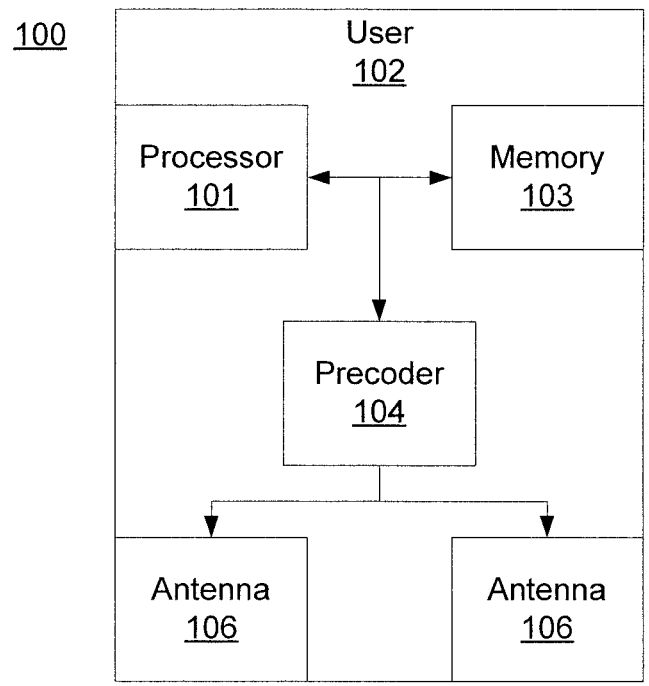
FIG. 1 is a diagram of an exemplary multiple-input multiple-output (MIMO) cellular system according to the present principles.
Figure 1:
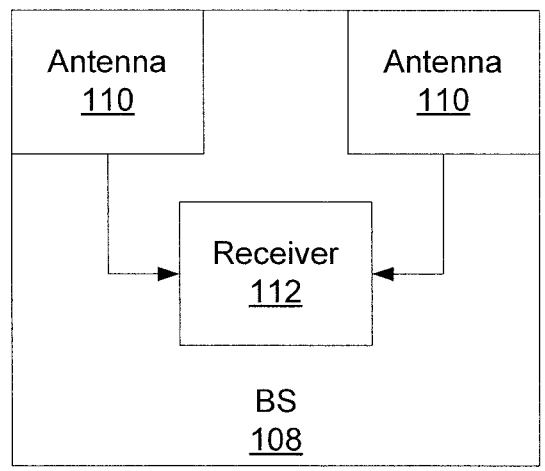

The present principles provide practical uplink resource allocation methods for 4G MIMO cellular uplinks. The term "resource" as used herein refers to subcarriers, modulation and coding schemes (MCS), as well as precoding matrices drawn from finite codebooks. The resource allocation methods for finite modulations (finite constellations) and finite precoding codebooks described herein comply with practical constraints on the assignment of sub-carriers, constellations and precoders to scheduled users. The resulting uplink resource allocation problems in both 802.16m and LTE-A networks are NP-hard. However, the present principles provide constant-factor polynomial-complexity approximation methods for both these problems and provide linear programming (LP) based upper bounds to benchmark the performance of said approximation methods. The present principles also provide rules for efficiently computing per-user signal-to-interference-plus-noise ratios (SINRs) that are used for evaluating per-user utilities.

In one special case of long-term evolution advanced (LTE-A) scheduling, wherein each user can be assigned at-most one chunk as in classical LTE uplink scheduling, solving a LP relaxation followed by a simple greedy rounding yields near-optimal performance that is almost indistinguishable from the LP upper bound. Thus, LP-plus-rounding is disclosed herein as a scheme for LTE/LTE-A scheduling. With respect to 802.16m orthogonal frequency division multiple access (OFDMA) scheduling, the greedy method of the present principles offers good performance that falls within 10% of the corresponding LP upper bound at a low complexity.

In the following illustrative embodiments, the base-station (BS) is equipped with $N_r \geq 1$ receive antennas and communicates with K multi-antenna users (e.g., mobile phones). The weighted sum of user-rates in each scheduling interval is optimized for an infinitely backlogged traffic model. For simplicity, it may be assumed that for each finite constellation (e.g., quadrature amplitude modulation (QAM)), ideal outer codes for a continuum of coding-rates between zero and one are available. This assumption is reasonable because, in practice, ten distinct coding rates are available even for the first transmission. Moreover, the small loss accrued with practical Turbo outer codes can be readily accommodated. N denotes the total number of resource blocks (RBs), where each RB is a pre-defined set of consecutive subcarriers and forms the minimum allocation unit.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, an illustrative multiple-input multiple-output system 100 is shown. A user terminal 102 may represent, for example, a handheld phone, laptop with a cellular connection, or any other appropriate device. The user terminal 102 includes a processor 101 in communication with a memory 103 that performs resource allocation and which provides uplink data to a precoder module 104. The precoder 104 weights data transmission outputs such to maximize overall link throughput and employs a predetermined precoder matrix W that accounts for channel irregularities. The precoder 104 then distributes the precoded uplink data to a plurality of antennas 106. The user terminal 102 may include any number K of antennas 106 greater than one, but for the sake of simplicity in illustration only two antennas 106 are shown herein. The user terminal 102 is in signal communication with base station (BS) 108, itself having multiple antennas 110. Again, although only two antennas 110 are shown in FIG. 1, it is contemplated that any number of antennas greater than one may be employed. The antennas 110 provide signal information to receiver 112, which decodes the data carried by said signals. The receiver 112 may be, for example, a linear minimum mean squared error (LMMSE) receiver.

As applied to discrete Fourier transform spread OFDMA (DFT-S-OFDMA), in any scheduling interval, each user can be allocated up-to two mutually non-contiguous chunks, where each chunk is a set of contiguous RBs. That is, if RBs i+1 and i−1 belong to a chunk, then RB i must belong to that chunk as well. The scheduled user 102 is assigned one precoder matrix W in precoder 104, drawn from a finite set or codebook of matrices. Further, the user 102 may be assigned one modulation and coding scheme (MCS) as a (constellation, coding-rate), if the rank of the assigned precoder 104 is one, and may be assigned two possibly distinct MCSes whenever the rank of the assigned precoder 104 is greater than one.

Let C denote the set of sub-carriers assigned to a user u, which together form n RBs that can be grouped into at-most two chunks. Let the RB size be B sub-carriers so that |C|=nB. Then, the frequency domain signals at the BS 108 of the subcarriers in C can be modeled as $$y_l = H_{u,l} x_{u,l} + v_l, \ l \in C,$$

where $H_{u,l}$ is the channel matrix that represents actual channel conditions seen from user u on subcarrier l, $v_l \sim CN(0,I)$ is the additive white Gaussian noise (AWGN) vector and $x_{u,l}$ is the channel vector output by user u 102 at tone l. An exemplary user u 102 may be assigned an $N_u^t \times R$ precoder matrix W (with tr($W^\dagger W$)=1/R), where $N_u^t$ is the number of transmit antennas 106 of the user 102 and R is the assigned transmission rank. The channel input vector is then $x_{u,l} = W s_{u,l}$, $\forall l$, where $s_{u,l}$ is the data vector provided by the processor 101 for user u 102 at tone l. Collecting all $s_{u,l}$ into a BnR×1 vector $s_u$ that represents the data transmitted by the user 102, $$s_u = \sqrt{\frac{P_u}{Bn}} (F_n \otimes I) u_u,$$

where $F_n$ is the Bn×Bn DFT matrix and $u_u$ is a BnR×1 vector of QAM symbols. It should be noted that the transmitted signal $x_{u,l}$ conforms to the power pooling constraint. Additionally, each assigned MCS corresponds to a codeword, and each element of $u_u$ can be uniquely mapped to one of the assigned codeword(s) using pre-defined mapping rules.

Letting $\tilde{H}_{u,l} = H_{u,l} W = [\tilde{h}_{u,l,1}, \ldots, \tilde{h}_{u,l,R}] \forall l$ and $\tilde{P}_u = P/B$, it is shown that, for each layer r, where $1 \leq r \leq R$, using a linear minimum mean-squared error (MMSE) at the BS 108 results in Bn scalar channels, all with identical SINRs given by:

$$\tilde{\gamma}_{u,r} = \frac{\gamma_{u,r}}{1-\gamma_{u,r}}, \text{ where}$$

$$\gamma_{u,r} = \frac{\sum_{l \in C} \gamma_{u,l,r}}{Bn} \text{ and}$$

$$\gamma_{u,l,r} = (\tilde{P}_u/n)\tilde{h}_{u,l,r}^\dagger (I + \tilde{P}_u \tilde{H}_{u,l}\tilde{H}_{u,l}^\dagger/n)^{-1}\tilde{h}_{u,l,r}.$$

A particular choice of precoder and constellation(s) is referred to herein as a mode, where one constellation is used for each rank-one precoder 104, with two constellations for all other precoders 104. P denotes a finite set of all possible modes. The practical constraint of assigning one precoder 104 (and, hence, one rank) to a scheduler user 102 along with at most two (constellation, coding rate) pairs is enforced by allowing each scheduled user to be assigned only one mode. The coding rate is implicitly determined once a mode and chunk(s) are assigned to a user.

The function $h(u,p,n,m,q_1,q_2)$ denotes the total rate obtained by assigning a mode p and n RBs to user u 102 in up to two chunks, with the first chunk being made up of m RBs and starting at RB $q_1$ and the second chunk being made up of n-m RBs and starting at RB $q_2$. $h(u,p,n,m,q_1,q_2)$ is computed as the sum of R per-layer rates, where R is the rank of the assigned precoder 104 under mode p. The rate of the $r^{th}$ layer is computed as nB times the mutual information of a scalar AWGN channel whose signal-to-noise ratio (SNR) is $\tilde{\gamma}_{u,r}$ and whose input alphabet is the assigned constellation. Because it is assumed that there is a continuum of ideal codes for each alphabet, the coding rates are implicitly determined upon computing $h(u,p,n,m,q_1,q_2)$.

To obtain an integer-programming formulation for the resource allocation program, a collection of indicator variables $\{\alpha_{u,p,i}^{n,m}\}$ are defined, such that $\alpha_{u,p,i}^{n,m}=1$ if the user u is assigned mode p and given a chunk of m contiguous RBs starting at RB i, with the total number of RBs given to the user is n, spread over at most two chunks. The resource allocation problem can then be formulated as:

$$\max_{\{\alpha_{u,p,i}^{n,m}\}} \sum_{u=1}^{K}\sum_{p \in P}\sum_{n=1}^{N}\sum_{m=1}^{n}\sum_{q_1=1}^{N-m+1}\sum_{q_2=q_1}^{N-[n-m]^++1} w_u$$

$$h(u,p,n,m,q_1,q_2)\alpha_{u,p,q_1}^{n,m}\alpha_{u,p,q_2}^{n,n-m},$$

$$\text{such that } \sum_{p \in P}\sum_{n=1}^{N}\sum_{m=0}^{n}\sum_{q=1}^{N-[m]^++1} \alpha_{u,p,q}^{n,m} \leq 2, \forall u \in \{1,\ldots,K\};$$

$$\sum_{u=1}^{K}\sum_{p \in P}\sum_{n=1}^{N}\sum_{m=0}^{n}\sum_{q=[i-m+1]^+}^{i} \alpha_{u,p,q}^{n,m} \leq 1, \forall i \in \{1,\ldots,N\}; \text{ and}$$

$$\alpha_{u,p,q}^{n,m} \in \{0,1\}, \forall u,p,n,m,q,$$

where $w_u$ is the weighting factor for the user u and $[x]^+ = \max\{1,x\}$. Note that in this formulation, the objective function together with the first constraint ensures that each user gets at most two non-contiguous chunks and is assigned at most one mode. The second constraint ensures that no two allocated chunks overlap.

It can be shown that the rate obtained with ideal Gaussian codes upon assigning a set of subcarriers C and precoder W is equal to $$nB\sum_r \log(1 + \gamma_{u,r}/(1-\gamma_{u,r})) = -nB\sum_r \log(1-\gamma_{u,r}),$$

and is jointly convex in $\{\gamma_{u,r}\}$. Thus, for any partition of the assigned nB subcarriers in C into two sets $C_1$ and $C_2$, having $n_1 B$ and $n_2 B$ subcarriers respectively, such that $$n = n_1 + n_2,$$

$$nB\sum_r \log(1 + \gamma_{u,r}/(1-\gamma_{u,r})) \leq$$

$$n_1 B \sum_r \log(1+\gamma_{u,r}^{(1)}/(1-\gamma_{u,r}^{(1)})) + n_2 B \sum_r \log(1+\gamma_{u,r}^{(2)}/(1-\gamma_{u,r}^{(2)}))$$

$$\text{where } \gamma_{u,r}^{(1)} = \frac{\sum_{l \in C_1} \gamma_{u,l,r}}{Bn_1} \text{ and } \gamma_{u,r}^{(2)} = \frac{\sum_{l \in C_2} \gamma_{u,l,r}}{Bn_2}.$$

This holds also for rates obtained using ideal codes constructed over QAM constellations. From the above formulation it can be shown that the total rate obtained by assigning the $u^{th}$ user nB subcarriers (in up to two chunks) and any mode can be upper bounded by the sum of the rates obtained on each chunk, where the rate for a chunk is computed using the same mode with the subcarriers in that chunk and a power per subcarrier of $\tilde{P}_u/n$. This result is exploited to obtain a linear programming (LP) based upper bound.

The maximum achievable rate for a user u 102 is $c_{u,p,i}^{n,m}$, computed for a chunk of m contiguous RBs starting at i, when the total number of RBs given to a user u 102 is n and when the mode used over all the assigned RBs is indexed by p. For each user u 102, $$h(u,p,n,m,q_1,q_2) \leq c_{u,p,q_1}^{n,m} + c_{u,p,q_2}^{n,n-m}.$$

This relationship holds for rates obtained using ideal Gaussian codes. The LP upper bound can now be obtained by solving $$\max \sum_{u=1}^{K}\sum_{p \in P}\sum_{n=1}^{N}\sum_{m=1}^{n}\sum_{q_1=1}^{N-m+1} w_u c_{u,p,q}^{n,m}\alpha_{u,p,q}^{n,m},$$

$$\text{such that } \sum_{p \in P}\sum_{n=1}^{N}\sum_{m=0}^{n}\sum_{q=1}^{N-[m]^++1} \alpha_{u,p,q}^{n,m} \leq 2, \forall u;$$

$$\sum_{q=1}^{N-m+1} \alpha_{u,p,q}^{n,m} = \sum_{q=1}^{N-[n-m]^++1} \alpha_{u,p,q}^{n,n-m},$$

$$\forall u \in \{1,\ldots,K\}, p \in P, n \in \{1,\ldots,N\} m \in \{1,\ldots,n\};$$

$$\sum_{u=1}^{K}\sum_{p \in P}\sum_{n=1}^{N}\sum_{m=1}^{n}\sum_{q=[i-m+1]^+}^{i} \alpha_{u,p,q}^{n,m} \leq 1, \forall i; \text{ and}$$

$$\alpha_{u,p,q}^{n,m} \in \{0,1\}, \forall u,p,n,m,q.$$

Figure 2:
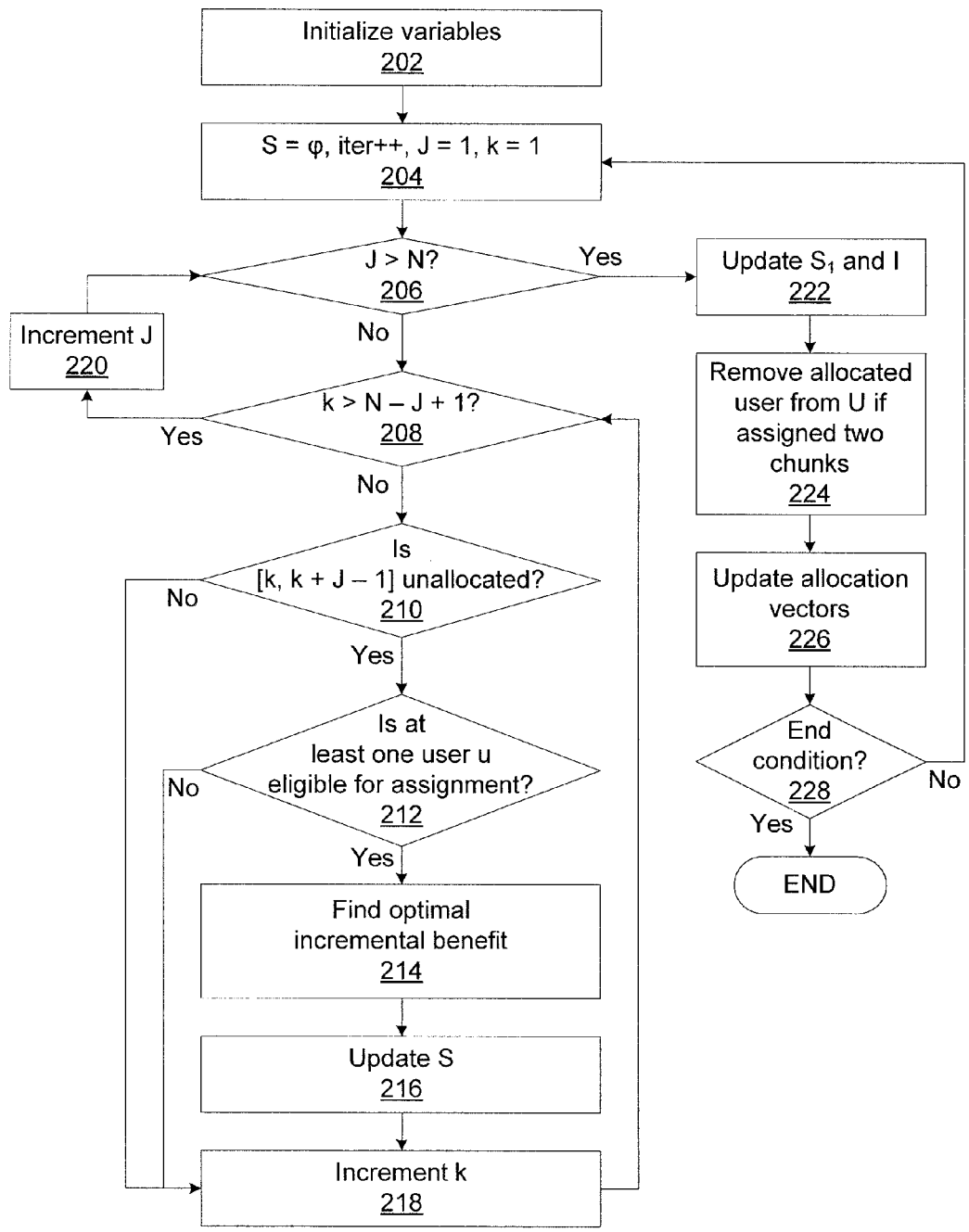
FIG. 2 is a block/flow diagram of an exemplary method for allocating resources in a cellular uplink in a long-term evolution advanced (LTE-A) system according to the present principles.

Referring now to FIG. 2, an exemplary method for uplink scheduling in LTE-A networks is provided according to the present principles. Block 202 begins by initializing the set of unallocated resource blocks $I=\{1,\ldots,N\}$, the set of users $U=\{1,\ldots,K\}$, the K×1 vector s=0 representing the starting RB indices of frequency chunks assigned to each user u, the K×1 vector v=0 representing the size of the frequency chunks assigned to each user u, the set $S_1=\phi$ representing the set containing the assignment of chunks to users with $\phi$ being the empty set, and iteration variable iter=0. The initialization of s(u)=0 and v(u)=0 indicates that the user u has not yet been assigned a chunk.

Block 204 begins a loop and sets J=1, and k=1, a temporary set S to empty while incrementing iter. Block 206 tests whether the iterating variable J is greater than N, the number of resource blocks. Block 208 tests whether the iterating variable k is greater than N−J+1 to determine whether any chunks remain. Block 210 tests whether a chunk defined by resource blocks [k,k+J−1] (i.e., k through k+J−1) is in the set of unallocated resource blocks I. If not, processing advances to block 218. If so, block 212 iterates over all users u, testing whether u is eligible for assignment to chunk [k,k+J−1]. If there is no eligible user, processing advances to block 218.

Block 212 tests using a function $f(u,k_1,n_1,k_2,n_2)$ as the incremental benefit obtained by assigning the chunk $[k_1,k_1+n_1-1]$ to the user u given that the user u has already been assigned $[k_2,k_2+n_2-1]$, where $k_1,n_1 \in \{1,\ldots,N\}$ and $k_2,n_2 \in \{0,\ldots,N\}$. If $k_2=n_2=0$, then the user u does not have a chunk assigned. The function $f(u,k_1,n_1,k_2,n_2)$ may be determined by selecting the best mode for each user u for the given choice of $k_1$, $n_1$, $k_2$, and $n_2$. The assignment of chunk [k,k+J−1] to user u may be more simply denoted as $\theta_{u,k}^J$. Thus, if $\theta_{u,k}^J \in S_1$, then the user has been assigned the chunk [k,k+J−1]. Furthermore, an operator to determine if two chunks overlap may be defined as $\chi(\theta_{u,k}^J, \theta_{m,i}^Q)=1$ when the intervals [k,k+J−1] and [i,i+Q−1] overlap and $\chi(\theta_{u,k}^J, \theta_{m,i}^Q)=0$ otherwise. Block 212 therefore tests whether $f(u,k,J,s(u),v(u))>0$, $$f(u,k,J,s(u),v(u)) \geq \delta_1 \sum_{\theta_{m,i}^Q \in S} \chi(\theta_{m,i}^Q, \theta_{u,k}^J) f(m,i,Q,s,(m),v(m)),$$

and $f(u,k,J,s(u),v(u)) \geq \delta_2 f(m,i,Q,s(m),v(m))$, $\forall f_{m,i}^Q \in S$: m=u. If those conditions are met, and the value of function $f(u,k,J,s(u),v(u))$ is higher than any previous incremental benefit, block 214 updates the optimal incremental benefit. Once all users u have been checked, block 214 outputs the assignment that produces the optimal incremental benefit.

The parameters $\delta_1, \delta_2$ are pre-determined tuning parameters. $\delta_1$ represents a multiple by which the incremental utility being tested must exceed the sum of all incremental utilities over tentative assignments saved in S which overlap with the interval [k,k+J−1], whereas $\delta_2$ represents the multiple by which the incremental utility being tested must exceed the incremental utility of the tentative assignment saved in S which was made for user u. A larger value for $\delta_1$ and/or $\delta_2$ makes it harder for user u to be eligible for assignment to chunk [k,k+J−1].

Having found an assignment, block 216 assigns the chunk [k,k+J−1] to the user u. The assignment $\theta_{u,k}^J$ is added to the set S, and any assignments $\theta_{m,i}^Q$ that exist in S such that $\chi(\theta_{u,k}^J, \theta_{m,i}^Q)=1$ or m=u are removed. Block 218 increments k and processing returns to block 208. If k is greater than N−J+1 at block 208, block 220 increments J and processing returns to block 206. If all of the chunks have been checked at block 206, the allocations in set S are added to set $S_1$ and the interval corresponding to $\theta_{m,i}^Q$ is removed from the set of unallocated blocks I, for all $\theta_{m,i}^Q$ in S.

If a user has been assigned two non-contiguous chunks, the user is removed from the set of unallocated users U at block 224. Block 226 updates the s and v vectors with information regarding the chunk allocations. Block 228 then tests the ending condition. Block 228 ends processing and outputs $S_1$ if S is null, if U is null, or if iter has reached a maximum number of iterations. Otherwise, processing returns to block 204.

A worst-case guarantee can be established for the above assignments that is valid for all sub-additive, per-user utilities that satisfy $$h(u,p,n,m,q_1,q_2) \leq c_{u,p,q_1}^m + c_{u,p,q_2}^{n-m},$$

where $c_{u,p,i}^m$ denotes a maximum achievable rate for a user u using mode p, computed for a chunk of m contiguous RBs starting at RB i with power per subcarrier $\tilde{P}/m$. This is weaker than the condition for h(•) described above, because the right-hand side of this condition is larger as the rate over each chunk is evaluated using the entire power $P_u$.

The resource allocation problem in LTE-A, as formulated above, is approximable-hard (APX-hard) and, hence, NP-hard. When the resource allocation method detailed above is initialized with $\delta_1=\delta_2=3$ and any maximum number of iterations greater than 1, there is a constant (1/27) approximation for the optimization problem.

The metric h(•) described above is generally non-linear and hence couples any two chunks allocated to the same user. To circumvent this difficulty, an upper bound is used as:

$$\max_{\{\alpha_{u,q}^m\}} \sum_m \sum_q \sum_u w_u c_{u,q}^m \alpha_{u,q}^m$$

$$\text{such that } \sum_m \sum_q \alpha_{u,q}^m \leq 2, \forall u;$$

$$\sum_u \sum_m \sum_{q=[i-m+1]}^{i} \alpha_{u,q}^m \leq 1, \forall i; \alpha_{u,q}^m \in \{0,1\}, \forall u, q, m,$$

where $c_{u,i}^m$ denotes the maximum achievable rate for user u, computed for a chunk of m contiguous RBs starting at RB i with power per subcarrier $\tilde{P}/m$. $c_{u,i}^m$ may be obtained by maximizing $c_{u,p,i}^m$ over all p∈P. Letting $\hat{V}$ be the optimal value of the above maximization and, hence, an upper bound to the optimal value of the resource allocation problem, and letting $\hat{U}$ be the weighted sum rate obtained after the first iteration of FIG. 2, it can be readily seen that, for any J and k, $f(u,k,J,0,0)=c_{u,k}^J$, and that the solution yielded in FIG. 2 is monotonically increasing across iterations. This is sufficient to show that $\hat{U} \geq \hat{V}/27$.

In the first iteration, established by blocks 204-228, each user is allocated at most one chunk and the weighted sum rate is already within the constant factor of 1/27 of the optimal. In each subsequent iteration, each user can be given at most one additional chunk, but the chunk-to-user assignments that have been made in previous iterations cannot be altered. However, the mode assignment can be altered for each user that receives an additional chunk. Under these constraints, the additional improvement obtained in each iteration is also within a constant factor of the maximum possible improvement. Note that convergence is guaranteed since the progression is monotonic. It follows from the above that, if $\delta_1=\delta_2=3/2$ and the maximum number of iterations is 1, a solution may be provided which assigns to each user at most one chunk and at most one mode. This is compatible with LTE scheduling.

Figure 3:
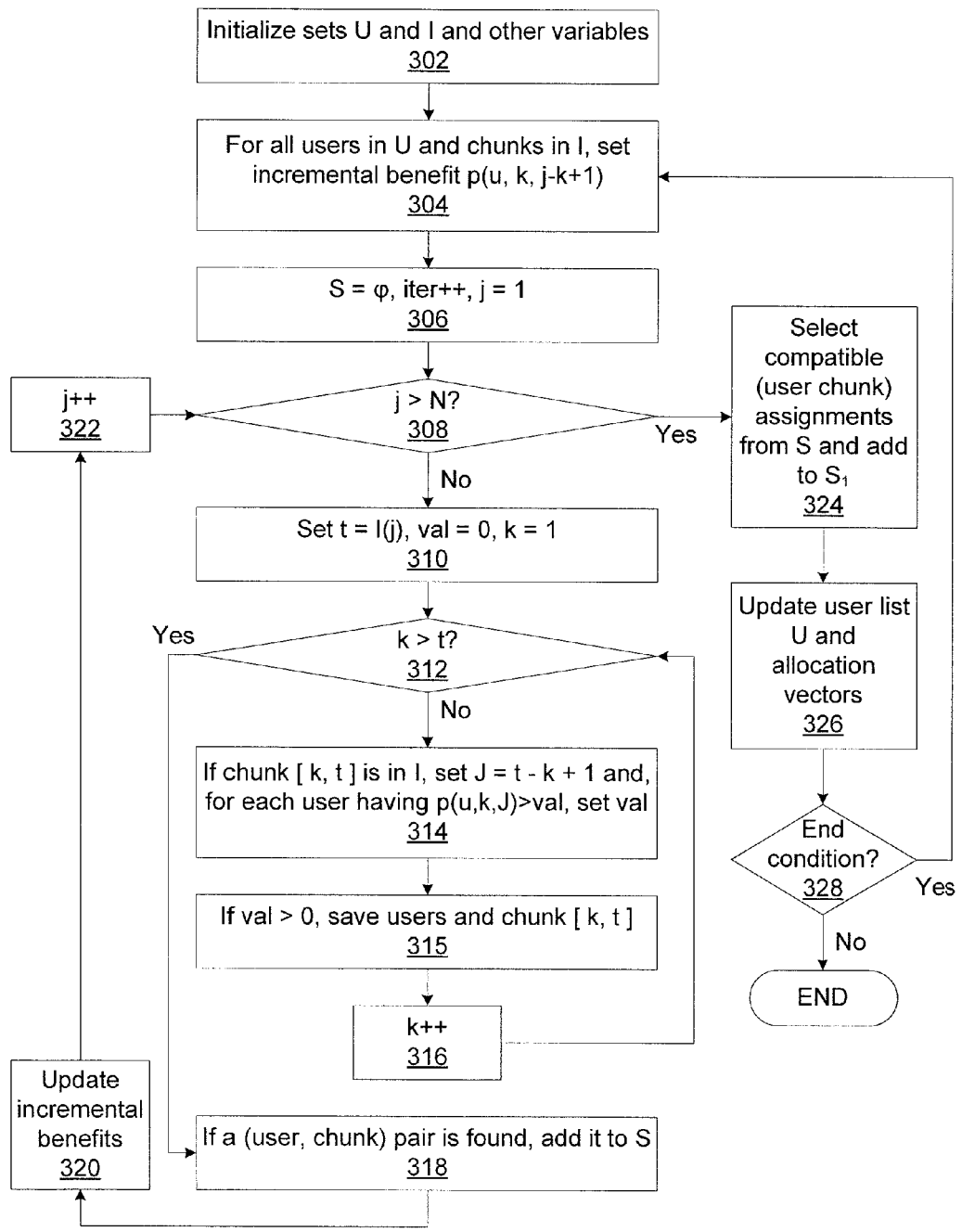
FIG. 3 is a block/flow diagram of an alternative method for allocating resources in a cellular uplink in an LTE-A system according to the present principles.

Referring now to FIG. 3, an exemplary method for uplink scheduling in LTE-A networks is provided according an alternative embodiment that provides a better approximation at the expense of additional complexity. FIG. 3 offers a constant worst-case guarantee of a ¼ approximation to the uplink scheduling problem. Block 302 initializes a set I to be the set of unallocated resource blocks, the set U to be the set of K users, the K×1 vector s=0 representing the starting RB indices of frequency chunks assigned to each user u, the K×1 vector v=0 representing the size of the frequency chunks assigned to each user u, the set $S_1=\phi$ representing the set containing the assignment of chunks to users with $\phi$ being the empty set, and iteration variable iter=0. The initialization of s(u)=0 and v(u)=0 indicates that the user u has not yet been assigned a chunk. For all users u in U and all chunks [k,j] (formed by RBs k through j) in I, block 304 sets the incremental utility (incremental benefit) function:

$$p(u,k,j-k+1)=f(u,k,j-k+1,s(u),v(u)).$$

Block 306 sets a temporary set S to the empty set, increments the iteration counter iter, and sets a new iteration variable j=1. Block 308 begins a loop over j that continues until j has exceeded the number of blocks N in the set I, noting that blocks are removed from I as they are allocated. Block 310 initializes a new set of variables, with t being set to the $j^{th}$ RB remaining in the set I, a temporary utility val being set to zero, and an iteration variable k=1. Block 312 begins a new loop over k that continues until k has exceeded t. Block 314 checks if the chunk [k,t] formed by resource blocks k through t is present in I. If so, block 314 first sets J=t-k+1. Then for each user u having an incremental benefit of p(u,k,J)>val, the temporary variable val is set as the new incremental benefit p(u,k,J). If such a user was found and, hence, if val>0, block 315 saves information regarding the (user, chunk) assignment (u,[k,t]). Block 316 increments k and returns processing to block 312.

Once k has exceeded t, block 318 checks and determines whether a (user, chunk) assignment was found in loop 312-316. If so, block 318 adds the found assignment to the set S. S is treated as an ordered set, such that assignments are pushed into S, and removal of an assignment from S removes the most recently added item. Block 320 then updates the incremental benefits of all (user, chunk) assignments that are positive and for which either the user is identical to the one in the assignment pushed most recently into S, or for which the chunk has an overlap with the chunk in the assignment pushed most recently into S. Block 322 increments j and processing returns to block 308.

Once block 308 has determined that j has exceeded the number of unallocated blocks N, block 324 first defines an empty set $S_2$ and then adds compatible new assignments from the set S to the set $S_2$. in a sequential manner starting from the assignment most recently added to S. An assignment $\theta_{m,i}^Q$ is compatible with a set if, for every $\theta_{u,k}^J$ in the set, [k,k+J-1]∩[i,i+Q-1]=$\phi$ and m≠u. All assignments in $S_2$ are then added to $S_1$. Furthermore, block 324 also removes the allocated blocks from I. If a user u has two allocations, block 326 removes the user from U. It also updates the s and v vectors with information regarding the assignments added to $S_1$. Block 328 then tests to determine whether an end condition has been reached. The end conditions include a lack of new allocations having been made in the last iteration (i.e., if the set $S_2$ remains empty), all users having two allocations, or a maximum number of iterations iter being reached. If no end condition has been reached, processing returns to block 304, otherwise processing completes and returns the set $S_1$ of allocations.

Regardless of whether FIG. 2 or FIG. 3 is used, the set $S_1$ is used to implement DFT-S-OFDMA cellular uplinks across antennas 106 for each user 102. Thus the present principles provide quick and efficient uplink allocations to the users of LTE-A MIMO systems with only minor approximation losses.

The present principles also provide uplink scheduling allocations for IEEE 802.16m systems, based on MIMO OFDMA. A signal transmitted by a user u 102 on a tone l may be modeled as above with $x_{u,l}=W_l s_{u,l}$, $\forall l$. $W_l$ is chosen as precoding matrix 104 for the user 102 on tone l, and $s_{u,l}$ is a vector of, e.g., QAM symbols. In this system, the resource allocation is relatively simpler since the RBs assigned to a user 102 need not be contiguous and no DFT spreading is done by the user prior to transmission.

In order to formulate the resource allocation problem, a finite set of modes M is defined, with each member identifying at least the transmission (i.e., precoding) rank for a scheduled user 102. Then, let $c_{u,m,j}^n$ denote the rate obtained by assigning RB j to user $u_1$ for a particular choice of m∈M, with the total number of RBs assigned to that user being n. Each user 102 divides its transmission power equally among all its assigned subcarriers so that the power-per-subcarrier can be deduced from n. Further, the total rate obtained for a user 102 can be expressed as the sum, over all RBs assigned to it, of per-RB rates since there is no DFT-spreading. Moreover, if narrow-band precoding is enabled, each mode can be used to identify a rank and a constellation for all assigned RBs. In 801.16m uplink, each scheduled user 102 is assigned a single (modulation, coding rate) pair in a scheduling interval.

On the other hand, when only wide-band precoding is enabled, each mode can be used to identify one precoder matrix, which also determines the rank, for all assigned RBs as well as a constellation. In each case, the practical constraints can be enforced by allowing only one mode per user. The rate obtained by assigning a mode to a user can be computed by using the parameter(s) identified by that mode and optimizing over the feasible values of the remaining free ones. Then, the MIMO OFDMA resource allocation problem can be posed as:

$$\max_{\{\alpha_{u,m,j}^n, \beta_{u,m}^n\}} \sum_{u=1}^{K} \sum_{m \in M} \sum_{n=1}^{N} \sum_{j=1}^{N} c_{u,m,j}^n \alpha_{u,m,j}^n$$

$$\text{such that } \sum_{u=1}^{K} \sum_{m \in M} \sum_{n=1}^{N} \alpha_{u,m,j}^n \leq 1 \forall j;$$

$$\sum_{j=1}^{N} \alpha_{u,m,j}^n \leq n \beta_{u,m}^n, \forall u, m, n;$$

$$\sum_{m \in M} \sum_{n=1}^{N} \beta_{u,m}^n \leq 1, \forall u; \text{ and}$$

$$\alpha_{u,m,j}^n, \beta_{u,m}^n \in \{0, 1\}, \forall u, q, m, n, j$$

Relaxing the binary-value constraints above yields a linear programming upper bound.

Figure 4:
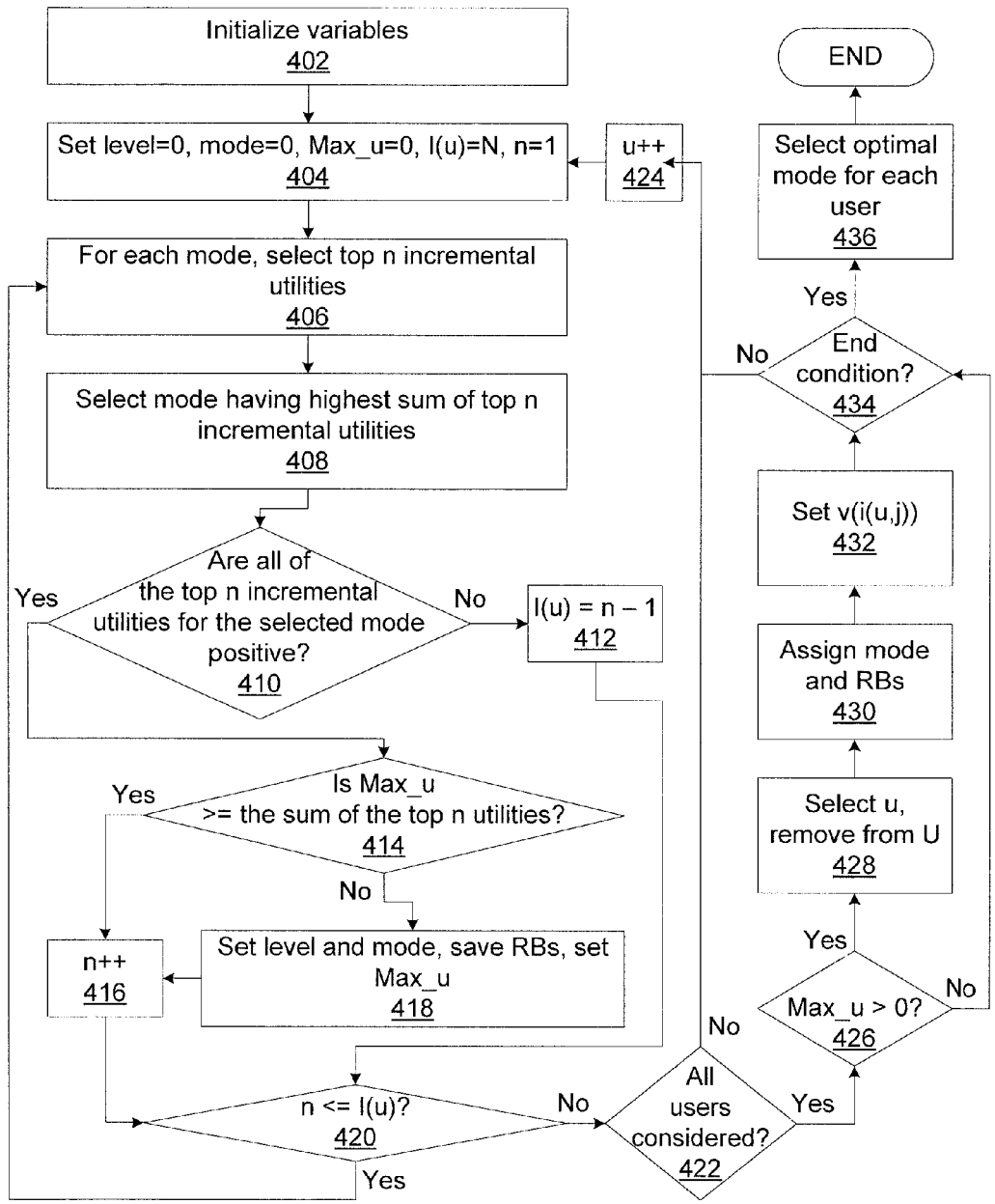
FIG. 4 is a block/flow diagram of an exemplary method for allocating resources in a cellular uplink in an 802.16m system according to the present principles.

Referring now to FIG. 4, a greedy approximation for solving the MIMO OFDMA resource allocation problem is shown. The problem is NP hard, but the method shown herein yields a constant ½ approximation for the optimization problem. Block 402 begins by initializing the rewards for each subcarrier i, v(i)=0 and the set U to be the set of users, and an initial user u in U. Block 402 also calculates weighted rates $w_u c_{u,q,i}^n$ across all users u, RBs i, and for all possible total number of assigned RBs n, and modes q to represent the "value" or "utility" of each assignment. Note that $w_u$ represents the weight or priority of user u and is given as an input.

Block 404 begins a loop over all of the users in U and initializes a number of loop variables, setting $level_u=0$, an initial mode $mode_u=0$, $Max_u=0$, $I(u)=N$, and $n=1$. $mode_u$ denotes the best mode that has been determined for user u so far, $Max_u$ denotes the best sum incremental value that has been determined for user u so far, $I(u)$ denotes the maximum number of RBs that can be assigned to user u and n represents a tentative number of RBs assigned to user u.

Block 406 checks all modes q for the user u and, for each mode q, it checks all resource blocks i to find the largest n values among $w_u c_{u,q,i}^n - v(i)$ where i ranges from 1 to N. Block 408 calculates the sum of the n largest incremental values for each mode q and selects the mode having the highest sum. Block 410 tests whether all of the top n incremental values for the selected mode q are strictly positive. If any of these values is less than or equal to zero, block 412 sets $I(u)=n-1$ and processing advances to block 420. If all of the values are positive, block 414 tests whether $Max_u$ is greater than or equal to the sum of the top n incremental values for the selected mode q. If so, n is incremented at block 416. If not, block 418 sets $level_u=n$, $mode_u=q$, and $Max_u$ to be sum of the top n incremental values for the selected mode q, and saves the RBs corresponding to the top n incremental values $i(u,1), \ldots, i(u,level_u)$. Block 416 then increments n and processing proceeds to block 420, which checks whether n is still less than or equal to $I(u)$. If so, processing returns to block 406. If not, block 422 determines whether all users in U have been considered. If not, the next un-considered user u from U is chosen and processing returns to block 404. If so, block 426 determines whether $Max_u$ is greater than zero for at-least one user u, which is to say that for at-least one user u a mode was found that satisfied blocks 410 and 414. If not, processing advances to block 434 to check the end condition.

If $Max_u>0$ for at-least one user u, block 428 selects a user u having the greatest $Max_u$ and removes the user from the set U. Block 430 assigns $mode_u$ and the associated RBs $i(u,1), \ldots, i(u,level_u)$ to the user u, removing them from previously assigned users if necessary. Block 432 then sets the utility of each assigned RB $v(i(u,j))=w_u c_{u,mode_u,i(u,j)}^{level_u}$, $\forall j, 1 \leq j \leq level_u$. Block 434 then determines whether the end conditions have been satisfied. In particular, block 434 tests whether the set U is empty or if $Max_u$ is less than or equal to zero for all users u in U. If neither condition is satisfied, processing proceeds to block 424, where u is incremented so that it is an initial user in U, before beginning the loop again at block 404. If an end condition is reached at block 434, block 436 selects an optimal mode that yields the highest rate for each user after pooling the user's power over its assigned RBs. Processing then ends, outputting the mode and RB allocations for all users.

At each step (e.g., for each user), the optimal modes for the user u are determined very efficiently. This is particularly advantageous because there are exponentially many RB allocation modes for each user, such that a naïve search will result in exponential complexity. In particular, at a given step, consider for example that the value of RB i (i.e., the maximum weighted rate on that RB among all users selected so far) is $v(i)$, and that the user u has not been selected previously. To determine the optimal modes for the user u, there can only be N distinct power levels. For a particular mode and power level, the best RB subset can be determined as the one comprising the RBs which correspond to the top values of the weighted rates. This can be determined using selection methods with a complexity that scales as $N+s \log(N)$, where s is cardinality of the subset of RBs. Thus, the optimal modes for a user u can be determined with a worst-case complexity that scales as $N^2 \log(N)|M|$, where M is the set of modes. There can be at most K steps and, at any step, there can be at most K unselected users, such that the overall complexity can scale no greater than $K^2 N^2 \log(N)|M|$.

Simulations performed on both OFDMA and DFT-S-OFDMA systems, using the systems/methods described above with respect to FIGS. 2 and 4, have shown good performance while maintaining low complexity. An exemplary test system was used having ten users 102, each user 102 having two transmitter antennas 106, and a base station 108 having four receiver antennas 110. The simulation system was designed with 1024 sub-carriers, out of which 350 were data sub-carriers used for scheduling users 102. The 350 data sub-carriers are split into 25 RBs, of 14 sub-carriers each, and the base station 108 employs an LMMSE receiver 112. For simplicity, all of the users 102 have identical transmit powers and can transmit in one of two ranks: using either a rank-1 beamforming vector or a rank-2 precoding matrix 104. It is assumed that the priorities of all users are identical.

Thus, the system utility to be considered in this homogenous system is the sum rate. Being homogenous, max-sum-rate scheduling will ensure long-term fairness. In these simulations, it has been shown that the scheduling method/system described with respect to FIG. 2 offers reasonable performance that is much greater than its worst-case guarantee. The method shown with respect to FIG. 4 also provides good performance at low complexity, falling within ten percent of the linear programming upper bound.

Having described preferred embodiments of a system and method for resource allocation in 4G MIMO cellular uplinks (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method of uplink resource allocation, the method comprising:
computing a set of utilities for each of a finite set of transmission modes with a processor across a plurality of user devices, each having multiple transmit antennas; and
iteratively allocating uplink resource blocks (RBs) and transmission modes to the plurality of user devices until all users have been allocated or no allocation is found, by:
selecting a mode that has a highest incremental utility sum for each user across one or more RBs;
determining which user has the highest incremental utility sum;
allocating the mode and RBs associated with the highest incremental utility sum to the user; and
removing the allocated user from consideration.

2. The method of claim 1, wherein the incremental utility is an incremental weighted rate.

3. The method of claim 1, wherein the iteratively allocating further includes deallocating RBs if those RBs have been allocated to a new user.

4. The method of claim 1, wherein a user is allocated any number of non-contiguous RBs.

5. The method of claim 1, wherein each user device has a power budget that is equally divided between its allocations.

6. The method of claim 1, wherein the user devices transmit on an 802.16m network.

7. A non-transitory computer readable storage medium comprising a computer readable program, wherein the computer readable program when executed on a computer causes the computer to perform the steps of claim 1.

* * * * *